US010224047B2

(12) United States Patent
Duchemin

(10) Patent No.: US 10,224,047 B2
(45) Date of Patent: Mar. 5, 2019

(54) METHOD AND DEVICE FOR PROCESSING A SIGNAL SUPPLIED BY A SENSOR FOR MEASURING THE PRESSURE EXISTING IN A CYLINDER

(71) Applicants: CONTINENTAL AUTOMOTIVE FRANCE, Toulouse (FR); CONTINENTAL AUTOMOTIVE GmbH, Hannover (DE)

(72) Inventor: Christophe Duchemin, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 6 days.

(21) Appl. No.: 15/408,494

(22) Filed: Jan. 18, 2017

(65) Prior Publication Data
US 2017/0212000 A1 Jul. 27, 2017

(30) Foreign Application Priority Data
Jan. 21, 2016 (FR) .................................... 16 50477

(51) Int. Cl.
*G01L 19/02* (2006.01)
*G10L 19/02* (2013.01)
(Continued)

(52) U.S. Cl.
CPC ............ *G10L 19/02* (2013.01); *F02D 35/023* (2013.01); *G01L 9/08* (2013.01); *G01L 19/04* (2013.01);
(Continued)

(58) Field of Classification Search
CPC ....................................................... G01L 19/02
(Continued)

(56) References Cited

U.S. PATENT DOCUMENTS 4,922,188 A * 5/1990 Mario ..................... G01R 19/04
324/103 P
5,925,819 A * 7/1999 Yoshinaga .............. F02P 17/12
324/399

(Continued)

FOREIGN PATENT DOCUMENTS

| FR | 2 938 645 A1 | 5/2010 |
| FR | 2 995 681 A1 | 3/2014 |
| FR | 3 011 581 A1 | 4/2015 |

OTHER PUBLICATIONS

FR Search Report, dated Oct. 10, 2016, from corresponding FR application.

*Primary Examiner* — Ricky Ngon
(74) *Attorney, Agent, or Firm* — Young & Thompson

(57) ABSTRACT

Disclosed is a method of processing a periodic voltage signal, called the input signal, relating to the pressure existing in a combustion chamber of a cylinder of an internal combustion engine. The method includes a step (E6) of determining a second instant of unlocking of the base signal during a second peak phase, a step (E7) of determining a second instant of locking, which is subsequent to the second instant of unlocking and for which the input signal is in the plateau phase consecutive to the second peak phase, and a step (E8) of generating a base signal between the second instant of unlocking and the second instant of locking on the basis of a slope value of a straight line determined during a first peak phase between a first instant of unlocking and a first instant of locking.

20 Claims, 3 Drawing Sheets

(51) Int. Cl.
*G01L 9/08* (2006.01)
*G01L 19/04* (2006.01)
*F02D 35/02* (2006.01)
*G01L 23/08* (2006.01)
*G01L 23/22* (2006.01)
*G01M 15/08* (2006.01)
*F02D 41/14* (2006.01)
*F02D 41/28* (2006.01)

(52) U.S. Cl.
CPC ............ *G01L 23/08* (2013.01); *G01L 23/226* (2013.01); *G01M 15/08* (2013.01); *F02D 2041/1429* (2013.01); *F02D 2041/1432* (2013.01); *F02D 2041/286* (2013.01)

(58) Field of Classification Search
USPC .......................................................... 702/50
See application file for complete search history.

(56) References Cited

U.S. PATENT DOCUMENTS

| | | |
|---|---|---|
| 2011/0264392 A1 | 10/2011 | Ramond et al. |
| 2015/0100265 A1* | 4/2015 | Duchemin ............ G01M 15/08 702/98 |
| 2015/0226626 A1 | 8/2015 | Duchemin |

* cited by examiner

METHOD AND DEVICE FOR PROCESSING A SIGNAL SUPPLIED BY A SENSOR FOR MEASURING THE PRESSURE EXISTING IN A CYLINDER

The present invention relates to the field of gas pressure measurement in a cylinder of an internal combustion engine, and more particularly to a method and a device for processing a signal supplied by a pressure measurement sensor in order to compensate for its offset.

An internal combustion engine conventionally comprises cylinders, each of which forms a combustion chamber into which fuel and an oxidizing agent are introduced to cause the combustion of the mixture. In such an engine, there is a known way of equipping each cylinder with a sensor for measuring the pressure existing in the combustion chamber. This pressure measurement sensor comprises a piezoelectric sensitive element which uses, in a known way, variations of electrical charge in order to provide, in a relative manner, an indication of the pressure existing in the cylinder. The sensor generates a voltage signal representative of these pressure variations and supplies it to the engine control computer of the vehicle, also called an electronic control unit ("Electronic Control Unit", or ECU, in English) of the engine, the signal then being referred to as the input signal. This computer uses the input signal to adjust some of the setting parameters of the vehicle engine, such as the injection of fuel into each cylinder or the post-treatment of polluting emissions.

An example of an input signal S_in is shown in FIG. 1. This input signal S_in varies in frequency and amplitude, and has peak phases P, called "main peaks", alternating with substantially linear phases, called "plateau" phases $S_P$. The peak phases P are representative of the peak pressures existing in the cylinder during the gas compression and combustion phases, while the plateau phases $S_P$ are representative of the pressure existing in the cylinder during the intake, expansion and exhaust phases.

In a known way, during a plateau phase $S_P$, the input signal S_in is offset to a substantial extent along a positive or negative slope, notably as a result of the vibrations affecting the sensor, changes in the engine speed, or noises generated by pyroelectric phenomena. In the last-mentioned case, the heating of the ceramic by the heat given off by the gas combustion in the cylinder may create a current that generates a supplementary electrical charge in the sensor, referred to as pyroelectricity.

FIG. 2 shows a detailed example of an input signal S_in of a pressure measurement sensor, affected by noise and offset in time t along a positive straight-line slope A. During the plateau phases $S_{P1}$, $S_{P2}$, $S_{P3}$, the voltage is shifted relative to a reference value $V_{REF}$ and is offset as a function of time, on average, along a positive straight-line slope in this example. The signal S_in exhibits small variations VAR representative of the noise at the top of the peak phases $P_1$, $P_2$, $P_3$ and on the plateaus $S_{P1}$, $S_{P2}$, $S_{P3}$ where peaks of small amplitude, called secondary peaks, may appear, these peaks being generated by valve noise or pyroelectricity. These secondary peaks may reach amplitudes close to the main peaks $P_1$, $P_2$, $P_3$ of small amplitude at low speeds of the vehicle engine, so that they may be confused with said main combustion peaks $P_1$, $P_2$, $P_3$.

In a known way, in order to make the input signal S_in usable, it must be corrected to compensate for its offset (referred to as "offset" in English) during the plateau phases $S_{P1}$, $S_{P2}$, $S_{P3}$. For this purpose, the pressure peaks $P_1$, $P_2$, $P_3$ must be detected in order to compensate the signal during the plateau phases $S_{P1}$, $S_{P2}$, $S_{P3}$ only, thus producing a signal in which the original main peaks $P_1$, $P_2$, $P_3$ alternate with zero-slope plateaus $S_{P1}$, $S_{P2}$, $S_{P3}$.

To this end, with reference to FIG. 3, there is a known way of determining what is called a base signal S_base, corresponding to the plateau phases $S_{P1}$, $S_{P2}$, in which signal the main peak phases $P_2$ have been replaced by portions of signal that can be used to connect said plateau phases $S_{P1}$, $S_{P2}$ to one another. To replace a peak portion $P_2$, the computer uses as the base signal S_base a sampled digital signal having substantially the same slope as the plateaus $S_{P1}$, $S_{P2}$ between an instant at the start of the peak, called the instant of unlocking, $t_D$ and an instant at the end of the peak, called the instant of locking $t_A$, for which said base signal S_base "catches up" with the input signal S_in, or in other words becomes substantially identical to the input signal S_in. The base signal thus consists of substantially linear portions which the computer uses to correct the input signal.

Also with reference to FIG. 3, in order to detect the instant of unlocking $t_D$ and the instant of locking $t_A$ the computer analyzes the input signal S_in to detect a steep slope representative of a main pressure peak $P_2$. If the slope of the peak $P_2$ is positive and greater than a threshold $\Delta 1$ of the start of the peak $P_2$, the computer defines the instant of unlocking $t_D$, after which a maximum and a strongly negative slope of the input signal S_in is observed during the peak. When the slope becomes small below a threshold $\Delta 2$ of the end of the peak $P_2$, the computer defines the instant of locking $t_A$.

However, it has been found that the base signal S_base may be destabilized when there are large changes in the engine speed (sharp acceleration or sharp deceleration when the driver lifts his foot from the accelerator pedal), or when there are temperature changes in which the piezoelectric element of the sensor generates pyroelectricity. This is because, during these changes, as shown in FIG. 3, the input signal may be overcompensated (I) or undercompensated (II), causing an end of the peak P2 to be detected when the value of the input signal S_in is too high M or too low N, resulting in excessively large variations of the slope of the base signal and consequently incorrect compensation of the input signal S_in.

The aim of the present invention is to overcome these drawbacks by proposing a simple and inexpensive solution for correcting an input signal supplied by a pressure sensor, which may be used for the effective management of the associated engine control parameters.

For this purpose, the invention proposes, in the first place, a method of processing a periodic voltage signal relating to the pressure existing in a combustion chamber of a cylinder of an internal combustion engine, said signal, called the input signal, having phases called plateau phases, in which the signal varies, on average, according to a linear function as a function of time, alternating with peak phases, in which the signal is representative of pressure peaks existing in the combustion chamber during the combustion of the gases, the input signal being associated with a signal called the base signal, corresponding at least partially to the input signal in the plateau phases and to a signal which is attenuated relative to the input signal in the peak phases, the base signal being dissociated from said input signal at an instant called the instant of unlocking, said method comprising, for a second peak phase which is subsequent to a first peak phase of the input signal and which is characterized by a first instant of unlocking and a first instant of locking of the base signal:

a step of determining a second instant of unlocking of the base signal during the second peak phase and a second instant of locking, which is subsequent to the second instant of unlocking and for which the input signal is in the plateau phase consecutive to the second peak phase, a step of generating the base signal between the second instant of unlocking and the second instant of locking on the basis of a slope value of a straight line determined during the first peak phase between the first instant of unlocking and the first instant of locking.

The term "linear" is taken to mean that the signal is not representative of a main pressure peak.

The method according to the invention can significantly reduce the variations of the offset of the input signal, notably by allowing the base signal to catch up the input signal during a plateau phase that has already commenced, in order to avoid phenomena of overcompensation or undercompensation. By using a slope value calculated during a peak phase preceding the input signal, the base signal is enabled to converge more effectively toward the plateau phase consecutive to the current peak phase, thereby allowing effective correction of the input signal. The terms "correct" and "correction" are taken to mean that the slope of the plateau phases of the input signal is canceled or substantially canceled.

Preferably, the second peak phase is consecutive to the first peak phase of the input signal. In a variant, the first peak phase could precede the second first peak phase by several periods of the signal.

According to one aspect of the invention, the method comprises:
  a step of determining the first instant of unlocking of the input signal,
  a step of determining a first peak instant for which it is determined that the top of the peak of the first peak phase has been reached,
  a step of determining the period of the input signal during the first peak phase,
  a step of determining the first instant of locking of the input signal, by adding a percentage of the period of the input signal to the first peak instant,
  a step of determining the slope value of the straight line connecting the input signal between the first instant of unlocking and the first instant of locking.

Advantageously, the added percentage is between 20% and 80%, preferably between 20% and 50%, or even more preferably about 30%, to ensure that the base signal catches up the input signal at a portion, for example about one third of the next plateau phase, which is subsequent to the portion of the input signal that may be subject to overcompensation or undercompensation phenomena.

Preferably, the method comprises a step of generating the base signal in the form of the input signal between the first instant of locking and the second instant of unlocking if the input signal varies linearly, and in the form of a linear interpolation of said input signal if the latter is representative of a secondary pressure peak, corresponding to valve noise for example.

According to one aspect of the invention, the method comprises a step of compensating the input signal on the basis of the base signal, in order to correct said input signal.

According to another aspect of the invention, the period of the input signal is determined to be between the peak instant immediately preceding the first peak phase and the peak instant of the first peak phase.

Advantageously, a pressure peak is detected when the input signal increases to a maximum value of amplitude and then decreases by a predetermined value of amplitude from said maximum value of amplitude.

The invention also relates to signal processing device suitable for mounting in a motor vehicle, said device comprising:
  a pressure measurement sensor for generating a voltage signal relating to the pressure existing in a combustion chamber of a cylinder of an internal combustion engine, said signal, called the input signal, having phases called plateau phases, in which the signal varies, on average, according to a linear function as a function of time, alternating with peak phases, in which the signal is representative of pressure peaks existing in the combustion chamber during the combustion of the gases, the input signal being associated with a signal called the base signal, corresponding at least partially to the input signal in the plateau phases and to a signal which is attenuated relative to the input signal in the peak phases, the base signal being dissociated from said input signal at an instant called the instant of unlocking,
  a computer configured, during a second peak phase subsequent to a first peak phase of the input signal characterized by a first instant of unlocking and a first instant of locking of the base signal, for:
    determining a second instant of unlocking of the base signal during the second peak phase,
    determining a second instant of locking, which is subsequent to the second instant of unlocking and for which the input signal is in the plateau phase consecutive to the second peak phase, and
    generating the base signal between the second instant of unlocking and the second instant of locking on the basis of a slope value of a straight line determined during the first peak phase between the first instant of unlocking and the first instant of locking.

According to one aspect of the invention, the computer is configured for:
  determining the first instant of unlocking of the input signal,
  determining a first peak instant for which it is determined that the top of the peak of the first peak phase has been reached,
  determining the period of the input signal during the first peak phase,
  determining the first instant of locking of the input signal, by adding a percentage of the period of the input signal to the first peak instant,
  determining the slope value of the straight line connecting the input signal between the first instant of unlocking and the first instant of locking.

Advantageously, the added percentage is between 20% and 80%, preferably between 20% and 50%, or even more preferably about 30%, to ensure that the base signal catches up the input signal at a portion, for example about one third of the next plateau phase, which is subsequent to the portion of the input signal that may be subject to overcompensation or undercompensation phenomena.

Preferably, the computer is configured for generating the base signal in the form of the input signal between the first instant of locking and the second instant of unlocking if the input signal varies linearly, and in the form of a linear interpolation of said input signal if the latter is representative of a secondary pressure peak, corresponding to valve noise for example.

According to one aspect of the invention, the computer is configured for compensating the input signal on the basis of the base signal, in order to correct said input signal.

According to another aspect of the invention, the computer is configured for determining the period of the input signal between the peak instant immediately preceding the first peak phase and the peak instant of the first peak phase.

Advantageously, the computer is configured for detecting a pressure peak when the input signal increases to a maximum value of amplitude and then decreases by a predetermined value of amplitude from said maximum value of amplitude.

Finally, the invention relates to a motor vehicle comprising a device as described above.

Other characteristics and advantages of the invention will be apparent from the following description which refers to the attached drawings, provided by way of non-limiting examples, in which identical references are given to similar objects.

FIG. 1, discussed above, is an example of an input signal supplied by a pressure measurement sensor.

FIG. 2, discussed above, is an example of an input signal supplied by a pressure measurement sensor.

FIG. 3, discussed above, is an example of an input signal supplied by a pressure measurement sensor.

The device according to the invention is designed to be mounted in a vehicle comprising an internal combustion engine having one or more cylinders, each cylinder forming a combustion chamber into which fuel can be injected and burnt. The device according to the invention can be used to process signals which each represent the pressure variations in the combustion chamber of each cylinder of the vehicle.

The device according to the invention will be described below with reference to FIG. 4. The device 1 comprises a pressure measurement sensor 10 and an engine control computer 20, also known as an ECU ("Engine Control Unit"). For the sake of clarity, only one pressure measurement sensor 10 is shown, but the device 1 could evidently comprise more than one sensor (the standard arrangement being one sensor for each cylinder of the engine block).

The pressure measurement sensor 10, of a known type, delivers a voltage signal relating to the pressure existing in the combustion chamber of a cylinder of the motor vehicle.

Figure 1:
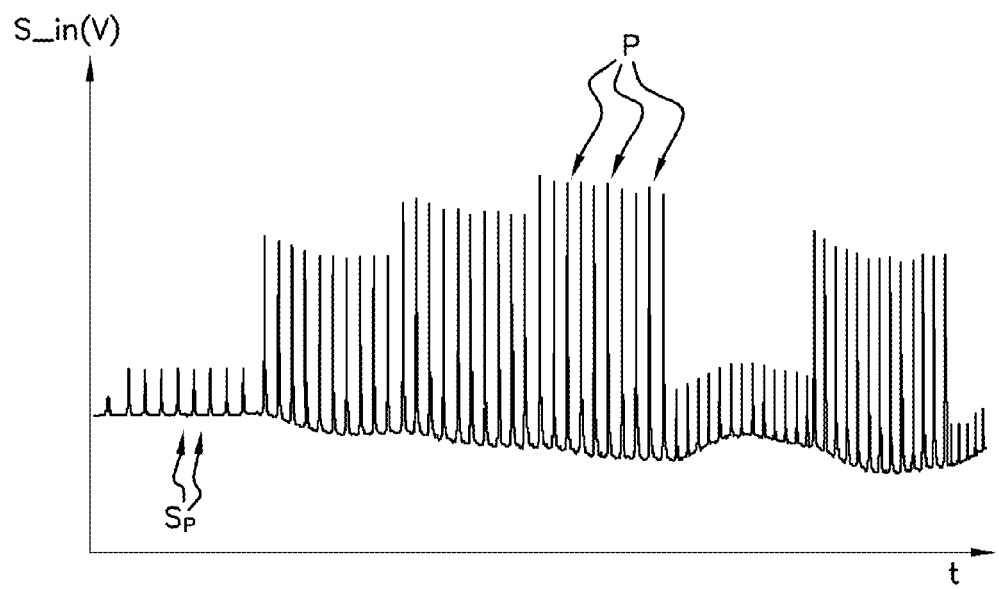
Figure 2:
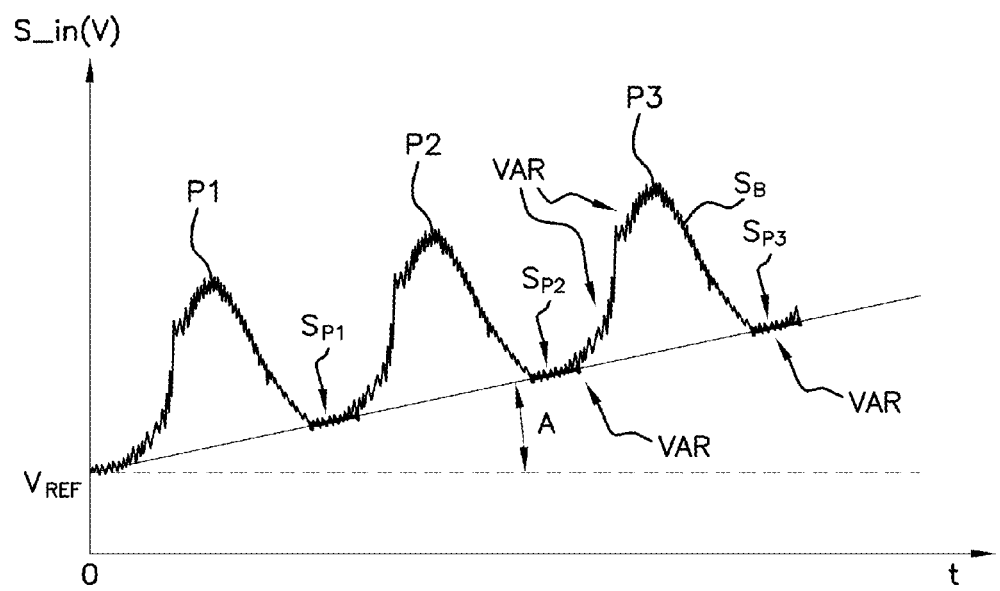
Figure 3:
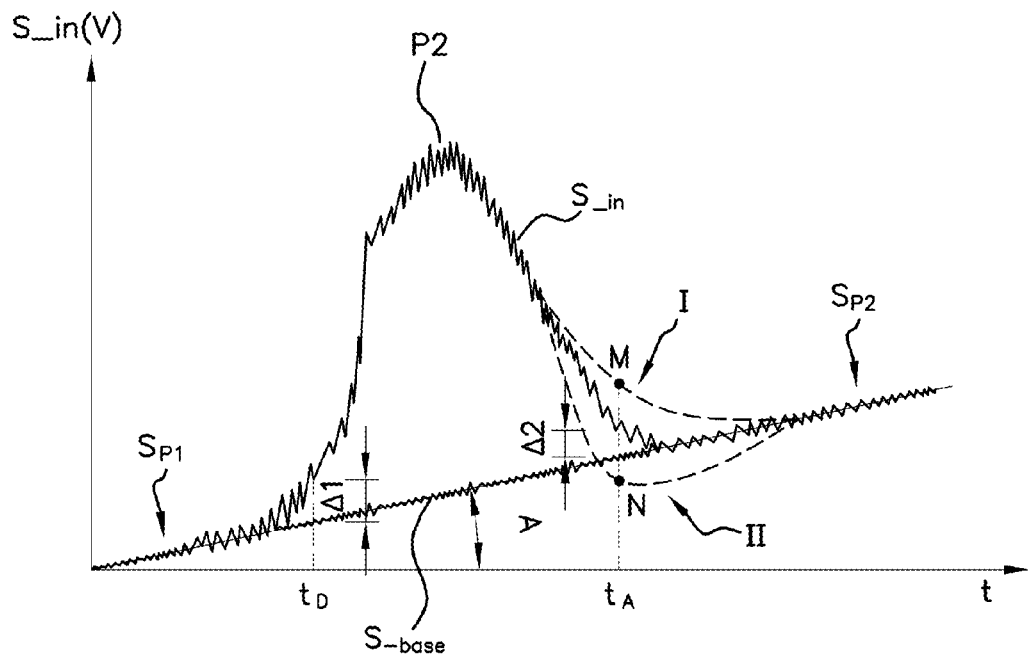

With reference to FIGS. 1 and 2, this signal is called the input signal S_in, because it is supplied to the input of the engine control computer 20.

With reference to FIG. 1, this input signal S_in varies in frequency and amplitude, and has peak phases P, called "main peaks", alternating with substantially linear phases, called "plateau" phases $S_p$. The main peaks P are representative of the peak pressures existing in the cylinder during the gas compression and combustion phases, while the plateaus $S_p$ are representative of the pressure existing in the cylinder during the intake, expansion and exhaust phases. The plateaus $S_p$ are substantially offset along a along a positive or negative slope, notably as a result of the vibrations affecting the sensor, changes in the engine speed, or noises generated by pyroelectric phenomena. In the last-mentioned case, the heating of the ceramic by the heat given off by the gas combustion in the cylinder may create a current that generates a supplementary electrical charge in the sensor, referred to as pyroelectricity.

In the example of FIG. 2, voltage is shifted relative to a reference value $V_{REF}$ during the plateau phases $S_{P1}$, $S_{P2}$, $S_{P3}$, and is offset as a function of time, on average, along a positive straight-line slope A in this example. The signal S_in exhibits small variations VAR representative of the noise at the top of the main peaks $P_1$, $P_2$, $P_3$ and on the plateaus $S_{P1}$, $S_{P2}$, $S_{P3}$ where peaks of small amplitude, called secondary peaks, may appear, these peaks being generated by valve noise or pyroelectricity, and possibly reaching amplitudes close to the main peaks of low amplitude appearing at low speeds of the vehicle engine, in such a way that they may be confused with the main combustion peaks.

The engine control computer 20 is configured to correct the input signal S_in so as to compensate its offset (referred to as "offset" in English) during the plateau phases $S_{P1}$, $S_{P2}$, $S_{P3}$. For this purpose, the pressure peaks $P_1$, $P_2$, $P_3$ must be detected in order to compensate the signal during the plateau phases $S_{P1}$, $S_{P2}$, $S_{P3}$ only, thus producing a signal in which the original main peaks $P_1$, $P_2$, $P_3$ alternate with zero-slope plateaus $S_{P1}$, $S_{P2}$, $S_{P3}$.

Figure 4:
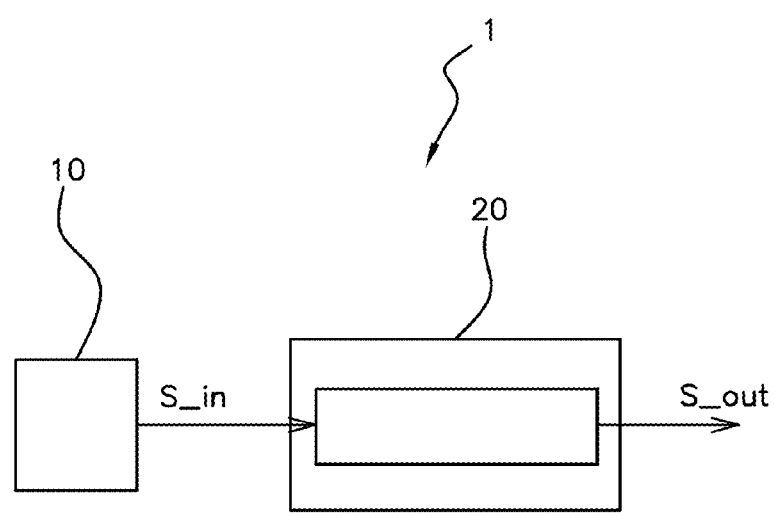
FIG. 4 is a schematic representation of a device according to the invention.

With reference to FIG. 4, the input signal S_in is acquired and processed by the engine control computer 20 which delivers a processed signal S_out at its output. This output signal S_out is used by the engine control computer 20 to manage or control certain operating parameters of the engine, such as the time and duration of fuel injection into the cylinders of the engine block. The engine control computer 20 may take the form of a dedicated integrated circuit of the ASIC (Application Specific Integrated Circuit, in English) type, connected to the pressure measurement sensor 10 and programmed to execute the method according to the invention.

Thus, in order to process the input signal S_in supplied by the sensor 10 according to the invention, the engine control computer 20 is configured to carry out a plurality of tasks.

Figure 5:
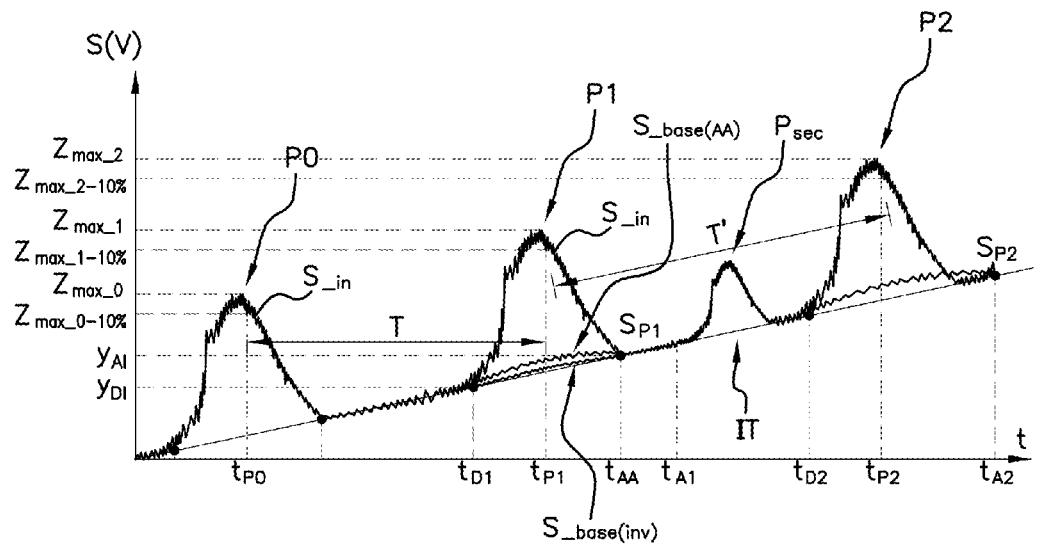
FIG. 5 shows a base signal estimation curve obtained by the processing method according to the invention.

Thus, with reference to FIG. 5, the engine control computer 20 is initially configured to determine the period T of the input signal S_in for a first peak phase P1, to determine a first instant of unlocking $t_{D1}$ of the input signal S_in, to determine a first peak instant $t_{P1}$ for which it is determined that the top of the peak of the first peak phase P1 has been reached, to determine a first instant of locking $t_{A1}$ by adding to the first peak instant $t_{P1}$ a percentage of the period T of the input signal S_in, and to determine the slope value of the straight line connecting the input signal S_in between the first instant of unlocking $t_{D1}$ and the first instant of locking $t_{A1}$.

The period T of the input signal S_in may be calculated between the peak instant $t_{P0}$ of the initial peak phase P0 preceding the first peak phase P1 and the peak instant $t_{P1}$ of the first peak phase P1. Advantageously, the percentage of the period T added is between 20% and 80%, preferably between 20% and 50%, or even more preferably about 30%, to ensure that the base signal S_base catches up the input signal S_in at a portion, for example about one third of the next plateau phase, which is subsequent to the portion of the input signal S_in that may be subject to overcompensation or undercompensation phenomena.

The engine control computer 20 is also configured, during a second peak phase P2 which is subsequent, and preferably consecutive, to the first peak phase P1, for determining a second instant of unlocking $t_{D2}$ of the base signal S_base during the second peak phase P2, for determining a second instant of locking $t_{A2}$, which is subsequent to the second instant of unlocking $t_{D2}$ and for which the input signal S_in is in the plateau phase $S_{P2}$ consecutive to the second peak phase P2, and for generating the base signal S_base between the second instant of unlocking $t_{D2}$ and the second instant of locking $t_{A2}$ on the basis of the slope value determined during the first peak phase P1 between the first instant of unlocking $t_{D1}$ and the first instant of locking $t_{A1}$.

The engine control computer 20 is also configured for detecting an instant $t_{P0}$, $t_{P1}$, $t_{P2}$ of peak pressure P0, P1, P2 if the input signal S_in increases to a maximum value of amplitude of Zmax_0, Zmax_1, Zmax_2 respectively, then decreases by a predetermined value of amplitude from said maximum value of amplitude Zmax_0, Zmax_1, Zmax_2, for example by 10% of the absolute value of the maximum value of amplitude Zmax_0, Zmax_1, Zmax_2.

Figure 6:
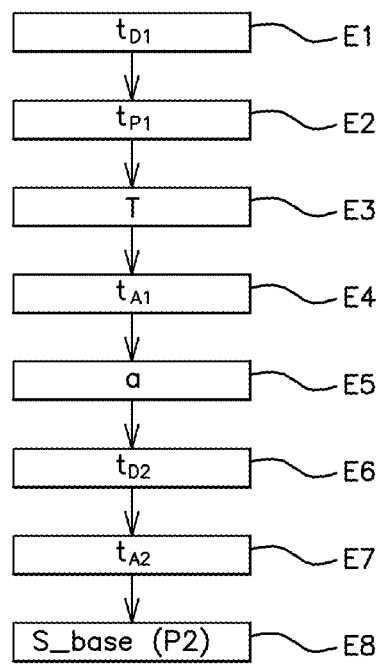
FIG. 6 shows an embodiment of the method according to the invention.

The invention will now be described in its application with reference to FIGS. 5 and 6.

It is assumed that an initial peak phase P0 has occurred and that the base signal S_base has been generated up to a first peak phase P1, being equal to the input signal S_in during an initial plateau phase $S_{P0}$ subsequent to the initial peak phase P0 and preceding the first peak phase P1.

In a step E1, the computer 20 initially determines a first instant of unlocking $t_{D1}$ of the base signal S_base relative to the input signal S_in during the first peak phase $P_1$.

In a step E2, the computer 20 determines the peak instant $t_{P1}$ of the first peak phase P1 (called the first peak instant $t_{P1}$). As explained previously, the engine control computer 20 detects an instant $t_{P1}$ of peak pressure P1 if the input signal S_in increases to a maximum value of amplitude of Zmax_1, then decreases by a predetermined value of amplitude from said maximum value of amplitude Zmax_1, for example by 10%. FIG. 5 shows the maximum values Zmax1, Zmax2 and Zmax3 and the values Zmax1−10%, Zmax2−10% and Zmax3−10% for, respectively and successively, the initial peak phase P0, the first peak phase P1 and the second peak phase P2.

Advantageously, a counter may be started at zero (or reset to zero) whenever the computer 20 determines a peak instant. If this time counter has been reset to zero too soon, for example at an instant corresponding to combustion noise in the rise of the peak, its memory is adjusted when the peak instant is detected.

In a step E3, the computer 20 determines the period T of the input signal for the first peak phase P1. For example, the engine control computer 20 determines the period T of the input signal S_in between the peak instant $t_{P0}$ of the initial peak phase P0 preceding the first peak phase P1 and the peak instant $t_{P1}$ of the first peak phase P1.

In a step E4, the computer 20 determines a first instant of locking $t_{A1}$ of the base signal S_base to the input signal S_in during the plateau phase $S_{P1}$ consecutive to the first peak phase $P_1$. The first instant of locking $t_{A1}$ is calculated by adding to the first peak instant $t_{P1}$ a percentage of the determined period T of the input signal S_in, for example 30% of the period T.

In a step E5, the value "a" of the slope of the straight line connecting the input signal S_in between the first instant of unlocking $t_{D1}$ and the first instant of locking $t_{A1}$ is determined by the following equation:

$$a = \frac{y_{D1} - y_{A1}}{t_{D1} - t_{A1}}$$

where $y_{D1}$ is the value of the input signal S_in at the first instant of unlocking $t_{D1}$, and $y_{A1}$ is the value of the input signal S_in at the first instant of locking $t_{A1}$.

According to the invention, the base signal S_base is then generated in the plateau phase $S_{P1}$ consecutive to the first peak phase P1 (called the first plateau phase $S_{P1}$):

in the form of the input signal S_in between the first instant of locking $t_{A1}$ and a second instant of unlocking $t_{D2}$ of the base signal S_base during a second peak phase $P_2$ consecutive to the first peak phase $P_1$ if the input signal S_in varies linearly, and in the form of a linear interpolation of said input signal S_in if the latter is representative of a secondary pressure peak, for example one corresponding to valve noise.

In step E6, a second instant of unlocking $t_{D2}$ of the base signal S_base during the second peak phase $P_2$ is determined, and in a step E7 a second instant of locking $t_{A2}$, which is subsequent to the first instant of unlocking $t_{D2}$ and for which the input signal S_in is in a second plateau phase $S_{P2}$ consecutive to the second peak phase $P_2$. As before the second instant of locking $t_{A2}$ is calculated by adding, for example, 30% of the determined period T' of the input signal S_in to the determined second peak instant $t_{P2}$.

It should be noted that the instants of unlocking $t_{D1}$, $t_{D2}$ may be determined in the same way as in the prior art, as explained in the previous paragraph describing the prior art (that is to say, by using an unlocking threshold Δ between the base signal S_base and the input signal S_in).

In a subsequent step E8, the base signal S_base during the second peak phase P2 between the second instant of unlocking $t_{D2}$ and the second instant of locking $t_{A2}$ is generated, by using the slope value determined in step E3 during the first peak phase P1, to allow the base signal S_base to converge toward the input signal S_in along a slope identical or virtually identical to that of the preceding plateau $S_{P1}$. The base signal S_base is then again equivalent to the input signal S_in, for the second plateau phase $S_{P2}$ (except at a secondary peak $P_{sec}$, where the input signal S_in is interpolated to generate a linear base signal S_base IT during this secondary peak).

During the process of generating the base signal S_base in the plateau phases $S_{P1}$, $S_{P2}$ and peak phases P1, P2, the engine control computer 20 compensates (in a known way) the input signal S_in on the basis of the base signal S_base, thereby effectively correcting said input signal S_in. Thus the linear regression signal is used in the plateau phases and the slope signal "a" is used in the peak phases, the instant of unlocking being detected from the difference between S_in and the regression signal S_base.

The method according to the invention can be used advantageously as an effective way of making the base signal of the peak phases dependent on the input signal of plateau phases, thereby significantly reducing the risks of unlocking in case of a steep positive slope of the offset, these risks arising, notably, as a result of pyroelectricity or major changes in the engine speed. It can be used, notably, to reduce the variations of slope of the signal during plateaus caused by a change of charge or pyroelectricity, and to minimize distortion for all engine speeds.

Thus, as shown in FIG. 5, the base signal generated by the method according to the invention, S_base(inv), converges more rapidly toward the input signal S_in than the base signal generated by the prior art method, S_base(AA), which caught up the input signal S_in at an instant of unlocking $t_{AA}$ before the second instant of unlocking $t_{D2}$ for which the value of the input signal was notably different from the value of the input signal in the first third of its linear plateau phase (the input signal still being in peak phase at $t_{AA}$). This enables the base signal generated according to the invention to be particularly robust to sudden changes in engine speed which cause large variations in the amplitude of the peaks and the slope of the plateaus.

The base signal also becomes more precise, enabling it to be used effectively in a control loop of the G loop type. It is no longer necessary to detect the ends of the peaks, as the detection of the start of the falling edge after detection of the maximum is sufficient.

Other advantages of the invention are seen, notably, in the simplicity of detection of the pressure peaks, the robust measurement of the signal period, and the independence from noise of the method based on the control of the period. In fact, since the determination of the period is easier and more precise than the detection of peaks, the use of an input signal value in the plateau, for example 30% of the period after a peak, makes the correction, and therefore the whole method, particularly robust.

Finally, it should be noted that the present invention is not limited to the examples described above and can be varied in numerous ways within the capacity of those skilled in the art. Notably, the shapes and values of the signals and the shapes and dimensions of the elements of the device 1, as shown in the figures to illustrate an exemplary embodiment of the invention, are not to be interpreted as limiting.

The invention claimed is:

1. A method of processing a periodic voltage signal relating to the pressure existing in a combustion chamber of a cylinder of an internal combustion engine, the periodic voltage signal being an input signal, having plateau phases, in which the input signal varies, on average, according to a linear function as a function of time, alternating with peak phases, in which the input signal is representative of pressure peaks existing in the combustion chamber during the combustion of the gases, the input signal being associated with a base signal, corresponding at least partially to the input signal in the plateau phases and to a signal which is attenuated relative to the input signal in the peak phases, the base signal being dissociated from said input signal at an instant of unlocking, said method comprising, for a second peak phase which is subsequent and consecutive to a first peak phase of the input signal and which is characterized by a first instant of unlocking and a first instant of locking of the base signal, the following steps:
   a step of determining the first instant of unlocking of the input signal;
   a step of determining a first peak instant for which it is determined that the top of the peak of the first peak phase has been reached;
   a step of determining the period of the input signal during the first peak phase;
   a step of determining the first instant of locking of the input signal, by adding a percentage of the period of the input signal to the first peak instant;
   a step of determining the slope value of the straight line connecting the input signal between the first instant of unlocking and the first instant of locking;
   a step of determining a second instant of unlocking of the base signal during the second peak phase;
   a step of determining a second instant of locking, which is subsequent to the second instant of unlocking and for which the input signal is in the plateau phase consecutive to the second peak phase; and
   a step of generating the base signal between the second instant of unlocking and the second instant of locking based on the slope value of the straight line determined during the first peak phase between the first instant of unlocking and the first instant of locking.

2. The method according to claim 1, wherein the added percentage is between 20% and 80%.

3. The method according to claim 2, further comprising a step of generating the base signal in the form of the input signal between the first instant of locking and the second instant of unlocking if when the input signal varies linearly, and in the form of a linear interpolation of said input signal when the input signal is representative of a secondary pressure peak.

4. The method according to claim 2, further comprising a step of compensating the input signal based on the base signal, in order to correct said input signal.

5. The method according to claim 1, further comprising a step of generating the base signal in the form of the input signal between the first instant of locking and the second instant of unlocking if when the input signal varies linearly, and in the form of a linear interpolation of said input signal when the input signal is representative of a secondary pressure peak.

6. The method according to claim 2, wherein the period of the input signal is determined between the peak instant immediately preceding the first peak phase and the peak instant of the first peak phase.

7. The method according to claim 5, further comprising a step of compensating the input signal based on the base signal, in order to correct said input signal.

8. The method according to claim 5, wherein the period of the input signal is determined between the peak instant immediately preceding the first peak phase and the peak instant of the first peak phase.

9. The method according to claim 1, further comprising a step of compensating the input signal based on the base signal, in order to correct said input signal.

10. The method according to claim 9, wherein the period of the input signal is determined between the peak instant immediately preceding the first peak phase and the peak instant of the first peak phase.

11. The method according to claim 1, wherein the period of the input signal is determined between the peak instant immediately preceding the first peak phase and the peak instant of the first peak phase.

12. The method according to claim 1, wherein the added percentage is between 20% and 50%.

13. The method according to claim 12, further comprising a step of generating the base signal in the form of the input signal between the first instant of locking and the second instant of unlocking when the input signal varies linearly, and in the form of a linear interpolation of said input signal when the input signal is representative of a secondary pressure peak.

14. The method according to claim 12, further comprising a step of compensating the input signal based on the base signal, in order to correct said input signal.

15. The method according to claim 12, wherein the period of the input signal is determined between the peak instant immediately preceding the first peak phase and the peak instant of the first peak phase.

16. The method according to claim 1, wherein the added percentage is approximately 30%.

17. The method according to claim 16, further comprising a step of generating the base signal in the form of the input signal between the first instant of locking and the second instant of unlocking when the input signal varies linearly, and in the form of a linear interpolation of said input signal when the input signal is representative of a secondary pressure peak.

18. The method according to claim 16, further comprising a step of compensating the input signal based on the base signal, in order to correct said input signal.

19. A signal processing device configured to be mounted in a motor vehicle, said device comprising:
 a pressure measurement sensor configured to generate a voltage signal relating to the pressure existing in a combustion chamber of a cylinder of an internal combustion engine, said voltage signal being an input signal, having plateau phases, in which the input signal varies, on average, according to a linear function as a function of time, alternating with peak phases, in which the input signal is representative of pressure peaks existing in the combustion chamber during the combustion of the gases, the input signal being associated with a base signal, corresponding at least partially to the input signal in the plateau phases and to a signal which is attenuated relative to the input signal in the peak phases, the base signal being dissociated from said input signal at an instant of unlocking; and
 a computer configured, during a second peak phase subsequent to a first peak phase of the input signal characterized by a first instant of unlocking and a first instant of locking of the base signal, to:
  determine the period of the input signal during the first peak phase,
  determine the first instant of unlocking of the input signal and a first peak instant for which it is determined that the top of the peak of the first peak phase has been reached,
  determine the first instant of locking of the input signal, by adding a percentage of the period of the input signal to the first peak instant,
  determine the slope value of the straight line connecting the input signal between the first instant of unlocking and the first instant of locking,
  determine a second instant of unlocking of the base signal during the second peak phase,
  determine a second instant of locking, which is subsequent to the second instant of unlocking and for which the input signal is in the plateau phase consecutive to the second peak phase, and
  generate the base signal between the second instant of unlocking and the second instant of locking based on the slope value of the straight line determined during the first peak phase between the first instant of unlocking and the first instant of locking.

20. A motor vehicle comprising:
 the signal processing device according to claim 19.

* * * * *